(12) United States Patent
Harding et al.

(10) Patent No.: US 6,345,933 B1
(45) Date of Patent: Feb. 12, 2002

(54) TANK WITH BACKFILL DEFLECTORS

(75) Inventors: Charles W. Harding, Clarkston; Richard T Harding, Troy; Terry D. Groh, Clarkston, all of MI (US)

(73) Assignee: Clawson Tank Company, Clawson, MI (US)

( * ) Notice: Subject to any disclaimer, the term of this patent is extended or adjusted under 35 U.S.C. 154(b) by 0 days.

(21) Appl. No.: 09/541,783

(22) Filed: Apr. 3, 2000

(51) Int. Cl.$^7$ .................................. F16L 1/06
(52) U.S. Cl. ................... 405/53; 405/157; 405/179; 405/184.4
(58) Field of Search ............... 405/184.4, 179, 405/157, 159.1, 172, 52, 53, 55, 54

(56) References Cited

U.S. PATENT DOCUMENTS

| | | | |
|---|---|---|---|
| 2,898,760 A | | 8/1959 | Pebley |
| 3,830,606 A | * | 8/1974 | Breitfuss ............ 425/59 |
| 3,948,408 A | * | 4/1976 | Trout et al. ......... 220/5 A |
| 4,068,488 A | | 1/1978 | Ball |
| 4,071,161 A | | 1/1978 | Gilbu |
| 4,110,947 A | * | 9/1978 | Murray et al. ....... 405/54 |
| 4,375,860 A | | 3/1983 | Greaves, Jr. |
| 4,884,709 A | | 12/1989 | McCarthy |
| 5,772,361 A | | 6/1998 | Gavin |
| 5,848,776 A | | 12/1998 | Craig et al. |
| 5,927,898 A | | 7/1999 | Gavin |
| 6,254,309 B1 | * | 7/2001 | Northcutt et al. ...... 405/53 |

FOREIGN PATENT DOCUMENTS

| | | | |
|---|---|---|---|
| FR | 2727997 | * | 6/1996 |
| JP | 237777 | * | 9/2000 |

* cited by examiner

*Primary Examiner*—David Bagnell
*Assistant Examiner*—Frederick L. Lagman
(74) *Attorney, Agent, or Firm*—Reising, Ethington, Barnes, Kisselle, Learman & McCulloch, P.C.

(57) ABSTRACT

An underground storage tank with backfill deflectors is provided to permit installation of the storage tank underground without requiring any workers to enter the excavation. The backfill deflectors are preferably elongate, and generally the same length as or longer than the storage tanks with which they are used and are installed on the bottom of the excavation on either side of the tank. The deflectors have walls which are sloped or inclined in a direction which tends to direct backfill dumped thereon underneath the storage tank. Desirably, the deflectors direct the backfill under the tank without requiring any of the workers to enter the excavation to shovel the backfill underneath the lower portion or haunches of the tank. After a sufficient level of backfill is introduced into the excavation and directed under the tank by the deflectors, the backfill is vibrated to achieve a compacted backfill under the tank which is sufficient to support the tank. Preferably, the backfill is vibrated with a concrete vibrator with a probe on a long cord or tether, and may be accomplished without any workers entering the excavation. Such a vibrator, commonly used to compact concrete in forms, will move the backfill into any voids in the backfill under the tank to provide an even support for the bottom of the tank along its entire length.

19 Claims, 4 Drawing Sheets

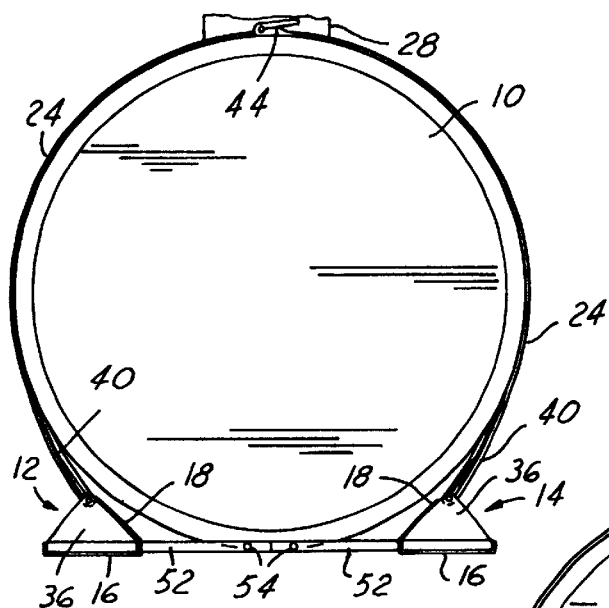
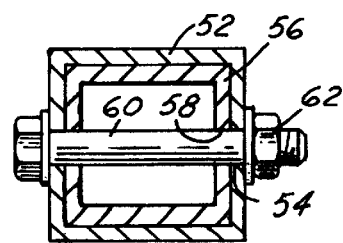
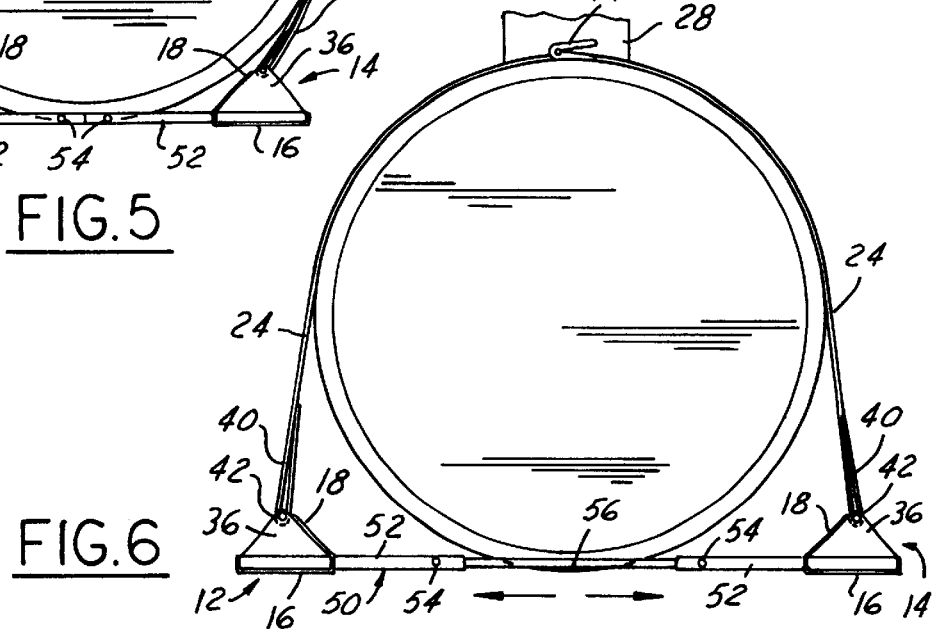
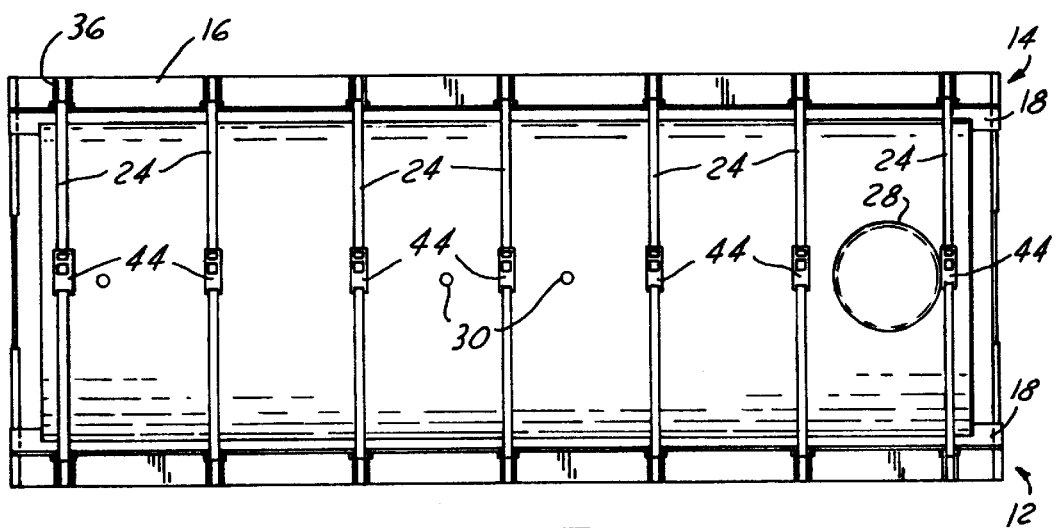
FIG. 4
FIG. 5
FIG. 6
FIG. 7

TANK WITH BACKFILL DEFLECTORS

FIELD OF THE INVENTION

This invention relates generally to storage tanks and more particularly to in-ground storage tanks and an improved method of installing them.

BACKGROUND OF THE INVENTION

Storage tanks installed underground have been used to retain a wide range of materials. Large storage tanks require a significant excavation in order to install them underground. To properly place and position the tank within the excavation, and thereafter to ensure that the tank is evenly supported by the backfill subsequently added to the excavation, workers have had to enter the excavation. In the United States, OSHA has promulgated worker safety rules which require that the sidewalls of the excavation be sloped or that sheet piling be provided along the walls to reduce the likelihood that the walls will collapse on the workers in the excavation. The sloped walls required by OSHA standards increase the size of the excavation and the time and cost to make the excavation. Similar authorities around the world have also promulgated similar rules.

Notably, with an underground storage tank of generally circular cross sectional shape, the lower portion of the tank must be supported evenly along its entire length to prevent concentration of stresses or bending or failure of the tank. To do this with a conventional storage tank and conventional process of installing the tank, workers have to enter the excavation to shovel or otherwise distribute backfill evenly under the tank. Thus, the excavation must be provided with sheet piling or sloped walls to protect the workers against a cave-in.

SUMMARY OF THE INVENTION

An underground storage tank with backfill deflectors is provided to permit installation of the storage tank underground without requiring any workers to enter the excavation. The backfill deflectors are preferably elongate, and generally equal in length or longer than the storage tanks with which they are used and are installed on the bottom of the excavation on either side of the tank. The deflectors have walls which are sloped or inclined in a direction which tends to direct backfill dumped thereon underneath the storage tank. Desirably, the deflectors direct the backfill under the tank without requiring any of the workers to enter the excavation to shovel the backfill underneath the lower portion or haunches of the tank. After a sufficient level of backfill is introduced into the excavation and directed under the tank by the deflectors, the backfill is vibrated to achieve a compacted backfill under the tank which is sufficient to support the tank. Preferably, the backfill is vibrated with a concrete vibrator with a probe on a long cord or tether, and may be accomplished without any workers entering the excavation. Such a vibrator, commonly used to compact concrete in forms, will move the backfill into any voids in the backfill under the tank to provide an even support for the bottom of the tank along its entire length. The backfill may also be compacted with a probe delivering compressed air onto or into the backfill.

The deflectors may be separate from the storage tank, being initially installed in the excavation in spaced relation, with the tank then set between the deflectors. Alternatively and preferably, the deflectors may be carried by the storage tank at least during installation of the tank and may be movable from a retracted position for shipment to an extended position suitable to deflect backfill underneath the tank. In another form, a cradle or base may be positioned beneath the tank with a supporting surface preferably complimentary to the bottom surface of the tank and the deflectors may be carried by the base and used to deflect backfill against the base and underneath portions of the tank not supported by the base. In any form, the backfill deflectors promote the displacement of backfill underneath the tank and permit installation of the tank underground without requiring any workers to enter the excavation. Therefore, no sheet piling needs to be provided, the walls of the excavation do not need to be sloped and the size of the excavation can be minimized for the particular application to reduce the time and cost to install the tank.

Objects, features and advantages of this invention include providing backfill deflectors for an underground storage tank which reduces the size of an excavation needed to install the tank, drastically improves worker safety by eliminating the need for any workers to enter the excavation to install the tank, provides a uniformly compacted layer of backfill underneath the tank to evenly support the tank along its length, reduces the likelihood that the tank will bend or fail due to lack of support, permits the tank to be strapped down to reduce or eliminate buoyancy of the tank, eliminates the need for a concrete slab over the top of the installed tank or below the tank or dead man strip anchors alongside the tank to prevent floatation of the tank, reduces the time and cost to make the excavation, and is of relatively simple design and economical manufacture and assembly.

BRIEF DESCRIPTION OF THE DRAWINGS

These and other objects, features and advantages of this invention will be apparent from the following detailed description of the preferred embodiments and best mode, appended claims and accompanying drawings in which:

FIG. 4 is a cross sectional view taken along line 4—4 of FIG. 3;

FIG. 5 is an end view of the tank illustrating the backfill deflectors in their retracted position beneath the tank for storage and shipment of the tank;

FIG. 6 is an end view as in FIG. 5 illustrating the backfill deflectors in their extended position prior to installation of the tank in an excavation;

FIG. 7 is a plan view of the tank and deflectors;

DETAILED DESCRIPTION OF THE PREFERRED EMBODIMENTS

Figure 1:
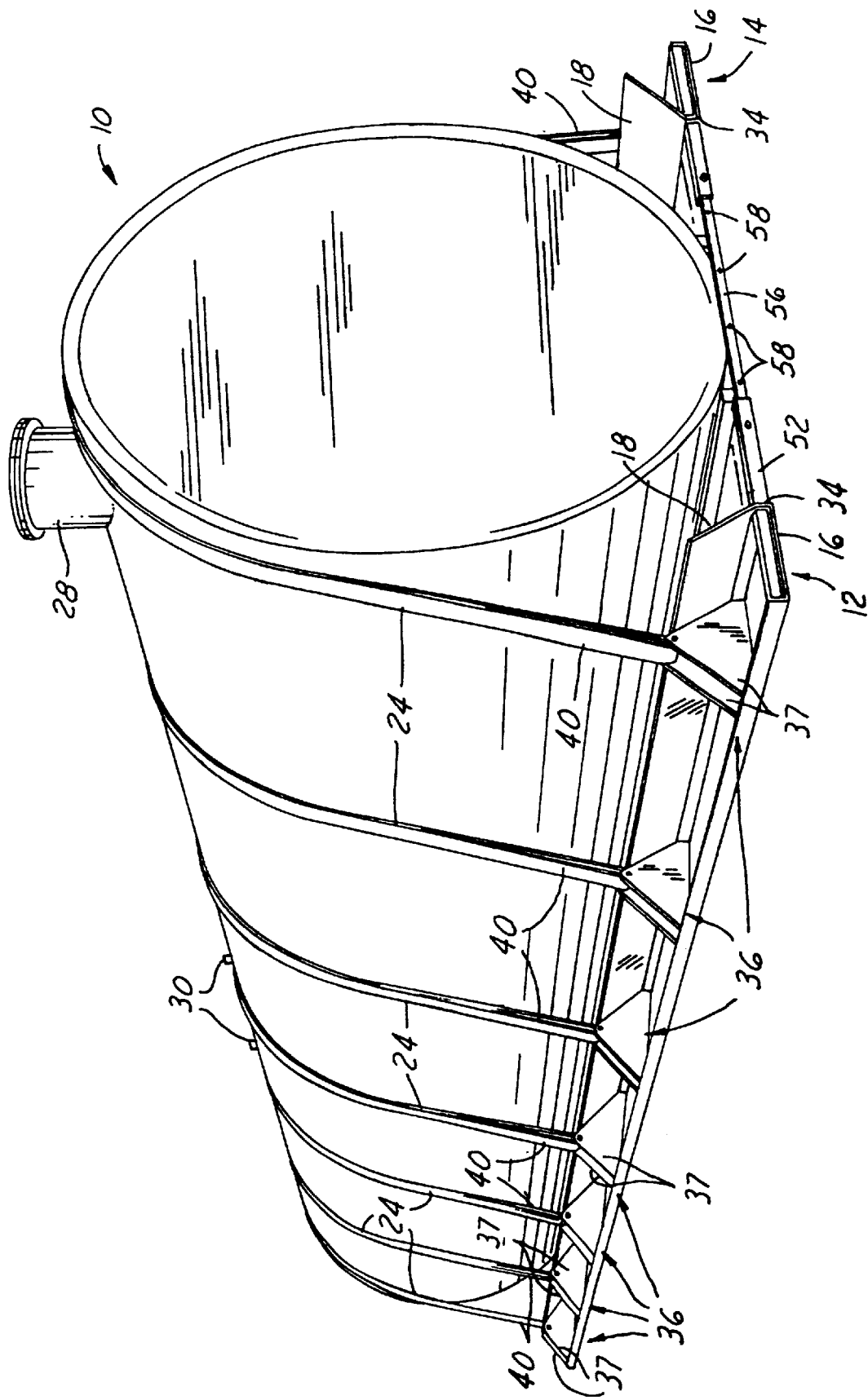
FIG. 1 is a perspective view of an underground storage tank having backfill deflectors embodying the present invention.
Figure 2:
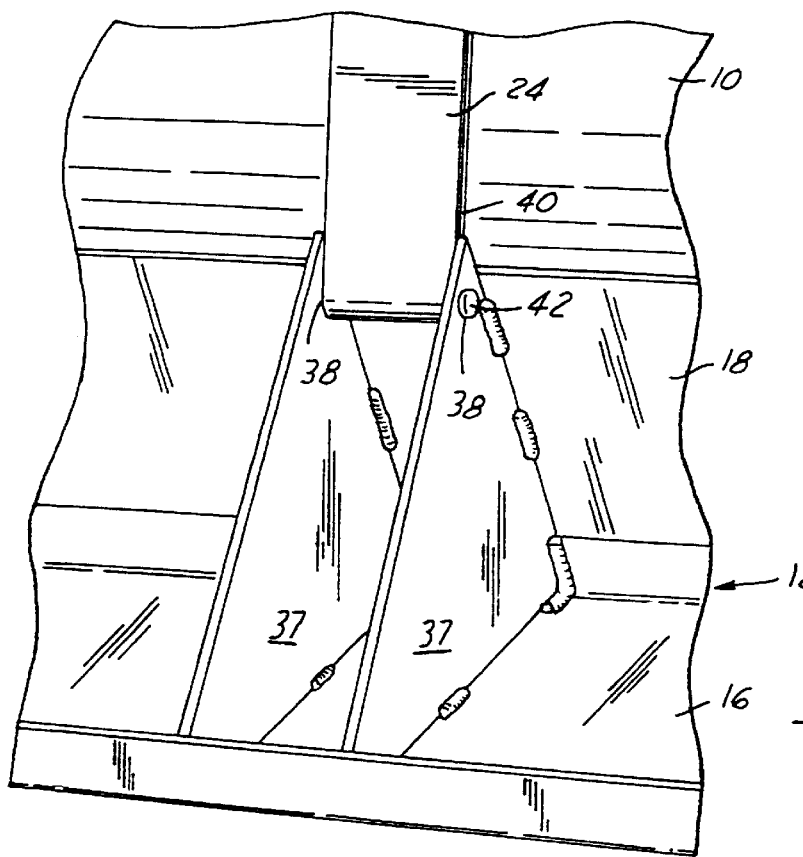
FIG. 2 is an enlarged fragmentary view of a portion of a backfill deflector.

Referring in more detail to the drawings, FIG. 1 illustrates an underground storage tank 10 with backfill deflectors 12, 14 one on either side of the tank 10 and each having a base 16 and an inclined deflecting wall 18 extending from the base 16 and adapted to direct backfill into an excavation 19 (FIG. 8) underneath the bottom of the tank 10. By directing the backfill underneath the bottom of the tank 10, the underground storage tank 10 can be installed in an excavation without requiring workers to enter the excavation while still providing the backfill underneath the tank which is necessary to evenly support the tank in the excavation. After deflecting a sufficient amount of backfill underneath the bottom of the tank 10, the backfill may be compacted with a vibrating compactor 20 (FIG. 8), such as commonly used to vibrate concrete within a form, having an elongate probe 22 permitting it to be operated from outside of the excavation so that this step may also be performed without any workers having to enter the excavation. Preferably, tie down straps 24 are attached to the backfill deflectors 12, 14 and loop overtop of the storage tank 10. The straps 24 help to orient the backfill deflectors 12, 14 relative to the tank 10 prior to installation in the excavation and also help to hold down the storage tank 10 against its buoyancy if water acts on and tends to float the tank.

The storage tank 10 may be an elongate, cylindrical container suitable for storing a wide range of flowable materials including liquids, gases or granular material and is adapted to be stored underground. As best shown in FIGS. 5–7, the tank may have an upwardly extending spout 28 adjacent to one end defining an inlet and discharge opening of the tank 10 through which the material to be stored is added to or removed from the tank. A pair of eyelets or lifting lugs 30 preferably extend from an upper surface of the tank 10 and are spaced equal distance from the center of mass of the tank 10 to facilitate lifting and moving the tank by a hook or cable connected to the lugs. The tank 10 may be formed (or molded) of various metallic or plastic materials. Evenly supporting the tank 10 along its entire length is critical to prevent bending or buckling of metallic tanks, and is at least as important for plastic tanks because of their tendency to be less ductile than steel or other metal materials and hence, more prone to fracturing and breaking rather than bending or buckling. With either plastic or metallic tanks, bending or uneven stresses can adversely affect the utility of the tank.

The backfill deflectors 12, 14 are elongate, and preferably at least as long as the tank 10 with which they are used. Each deflector 12, 14 comprises a generally planar base 16 adapted to lie generally flat along the bottom 32 of the excavation 19 and an inclined wall 18 extending at an acute included angle relative to the base 16 from an edge 34 of the base 16 closest to the tank 10 and extending generally parallel to a longitudinal axis of the tank. The inclined wall desirably extends at an angle of between 20 to 70 degrees, preferably about 45 degrees relative to the base. A plurality of spaced apart generally triangular supports 36 are fixed to the base 16 and are preferably also fixed to the inclined wall 18 to maintain the position of the inclined wall 18. Desirably, each support 36 has a pair of laterally spaced, matching triangular support plates 37 provided with aligned openings 38 therethrough. The deflectors 12, 14 are formed from a suitable, sturdy preferably metallic material so that they are sturdy and durable in use.

Figure 3:
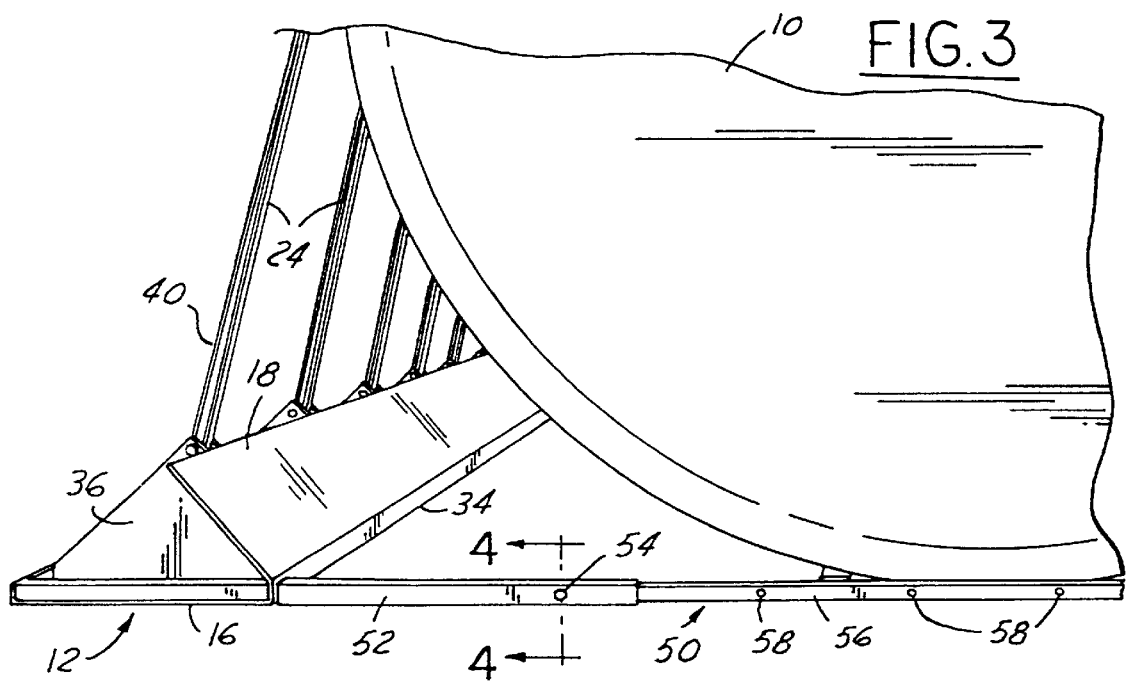
FIG. 3 is an enlarged fragmentary end view of the tank with backfill deflectors.

Desirably, a plurality of tie down straps 24 may be provided interconnecting the deflectors 12, 14 and extending over the tank 10. The straps 24 permit the tank 10 and deflectors 12, 14 to be lifted and placed in the excavation 19 as a unit and maintains their position relative to each other. The tie down straps 24 may be formed of substantially any material having suitable strength and being substantially inextensible to securely hold the tank relative to the backfill deflectors. The tie down straps 24 may be constructed of substantially any metallic or nonmetallic material, such as steel, FRP, nylon, polyester, aramid or other strong, flexible materials. The tie down straps 24 have a loop 40 at each end which may be permanently formed such as by heat sealing or stitching a portion of the strap onto itself. As shown in FIG. 3, the tie down straps 24 are installed on the deflectors 12, 14 by disposing a loop 40 of the strap between two adjacent support plates 37 of each support 36 and inserting a pin or bolt 42 through the aligned openings 38 of the support plates 37 and the loop 40 simultaneously. Each tie down strap 24 can then be separately tightened by a conventional take up and locking mechanism 44.

As best shown in FIGS. 1 and 3–6, the pair of backfill deflectors 12, 14 are preferably coupled together by an extendable tie bar 50 at each end. The tie bar 50 has a pair of hollow, outer arms 52 each fixed to one backfill deflector 12, 14 at one end and having a free end with an opening 54 therethrough and in which a complementary center adjustment rod 56 is slidably received. The adjustment rod 56 has a plurality of holes 58 formed therethrough which are selectively aligned with the openings 54 through both outer arms 52 to receive a separate pin or bolt 60 through each outer arm 52 secured by a nut 62 (FIG. 4) to releasably retain the position of the outer arms 52 relative to the adjustment rod 56. Therefore, as shown in FIG. 5, the backfill deflectors 12, 14 may be retracted and received underneath the tank 10 such as for storage or shipping of the tank by sliding the outer arms 52 towards each other to draw the backfill deflectors 12, 14 toward each other. Thereafter, as shown in FIG. 6, when it is desired to install the tank 10 in an excavation 19, the outer arms 52 may be slidably displaced outwardly in opposed directions to further separate the backfill deflectors 12, 14 and position them as desired relative to the tank 10 and then inserting a bolt 60 through each arm 52 and the adjustment rod 56 to maintain their desired position.

Figure 8:
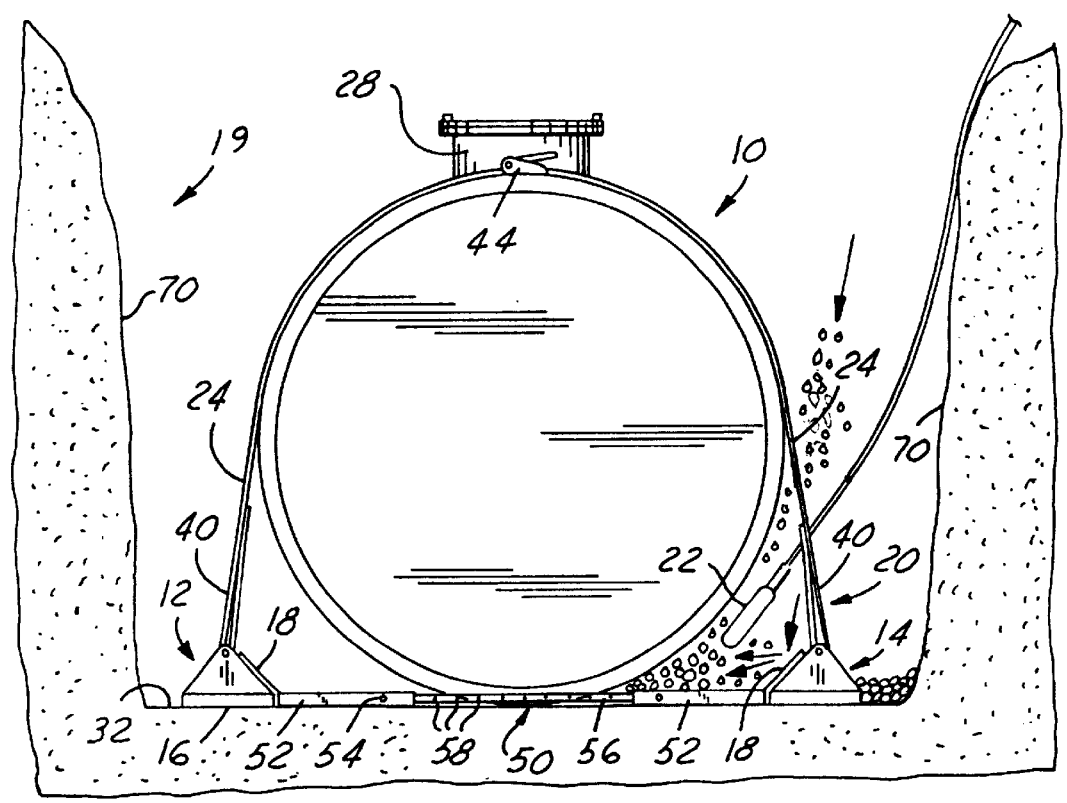
FIG. 8 is an end view of the tank and deflectors disposed within an excavation illustrating the initiation of the backfill process.

To install the tank 10, as shown in FIG. 8, an excavation 19 is made in the ground which may have substantially upright side walls 70 and preferably has a generally flat bottom 32. The excavation 19 is preferably initially backfilled with an approximately six to twelve inch deep bedding layer of clean, homogenous, granular material made of either sand, pea gravel, #8 crushed stone, native soil or other backfill material prior to placing the tank 10 into the excavation 19 to provide proper support for the tank 10. The bottom 32 of the excavation 19 can be flat or sloped slightly from end to end to effectively provide a sump in the tank facilitating emptying of the tank 10. After the bottom 32 of the excavation 19 is prepared, the tank 10 with the backfill deflectors 12, 14 attached thereto via the tie down straps 24 is lifted by the lifting lugs 30 and placed in the excavation 19 as desired.

Next, backfill material, which may be any suitable backfill material such as clean, homogenous, granular backfill material made of either sand, pea gravel, #8 crushed stone or native soil, is introduced into the excavation 19 by workers outside of the excavation. At least a portion of the backfill material introduced into the excavation 19 contacts the inclined wall 18 of each backfill deflector 12, 14 and is hence, deflected underneath the bottom radii or haunches of the tank 10. After a sufficient amount of backfill material is deflected underneath the tank 10 along its entire length, a vibrating compactor 20 with a probe 22 on a tether is lowered into the excavation 19 and is used to compact the backfill between the deflectors 12, 14 and the tank 10.

Alternatively, a compactor having a probe which conducts pressurized air into the backfill material, pushing it further under and consolidating the backfill under the haunches of the tank may be used. This moves the backfill into any voids not filled by the deflecting of the backfill under the tank 10 and firmly compacts the backfill and ensures that the tank 10 is evenly supported along its entire length. Additional backfill can then be added and deflected underneath the tank 10 and additional compacting steps may be intermittently performed to ensure that the backfill is evenly distributed and firmly compacted to continuously support the tank 10 along its length to prevent stress concentrations from developing in the tank 10 or bending or failure of the tank.

The backfill process is continued until the tank 10 is completely surrounded and covered by a layer of backfill over its top sufficient to protect it from damage, with the exception of fittings along the top of the tank and its spout 28 which may optionally extend above the ground or close thereto. Desirably, if the tank 10 is installed in an area subject to a high water table which may cause the tank 10 to become buoyant and tend to float out of the ground, the tie down straps 24 hold the tank 10 to the deflectors 12, 14 which are firmly embedded in the excavation 19 by the backfill provided and compacted thereon. Therefore, the need to tie the tank 10 down to a cement slab in the excavation 19 or the need to provide a concrete or other slab over the installed tank is eliminated.

Figure 9:
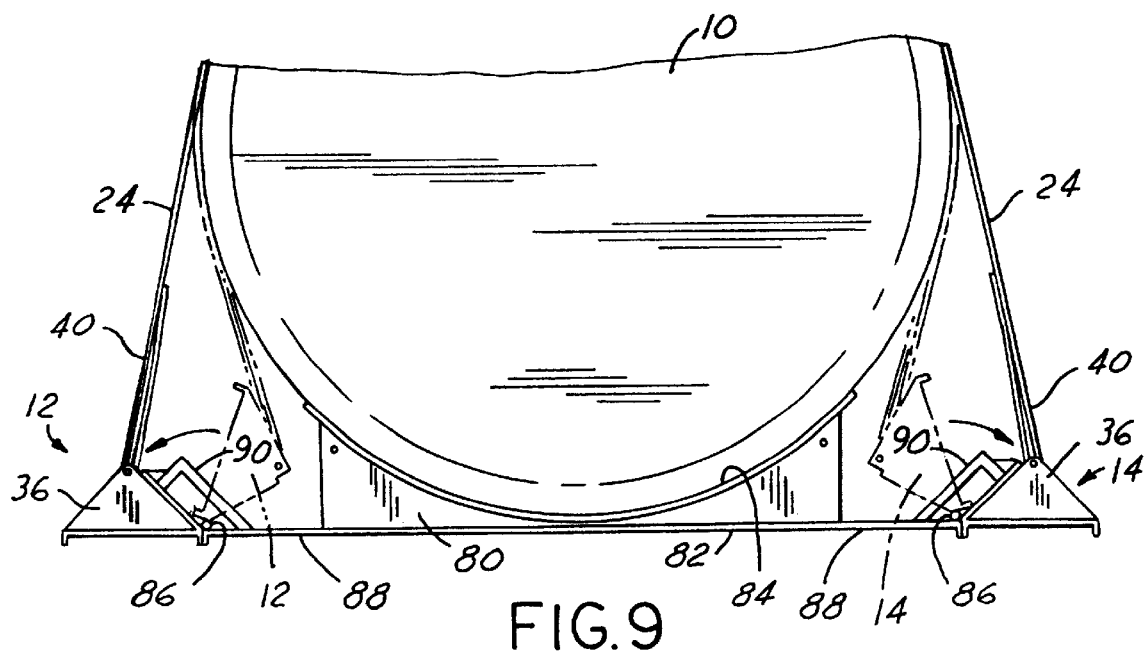
FIG. 9 is a fragmentary end view of a tank and backfill deflectors according to a second embodiment of the invention.

An alternate embodiment is shown in FIG. 9 which provides a tank support saddle at each end of a tank support pan 80 having a generally flat bottom 82 adapted to be disposed on the bottom of the excavation 19 and an arcuate top wall 84 complementary in shaped to the corresponding bottom wall of the tank 10 to evenly support the tank 10 at each end. The backfill deflectors 12, 14 may be constructed in the same manner as in the first embodiment and may be pivotally mounted about a hinge 86 connected to a leg 88 extending outwardly from the pan 80 or to the pan itself. After the backfill deflectors 12, 14 are rotated away from the pan into position for installation of the tank 10, they may be maintained in this position by a suitable locking member 90. Desirably, the backfill deflectors 12, 14 in the second embodiment serve the same general purpose which is to deflect backfill underneath the tank 10 and adjacent to the pan 80 with such backfill thereafter being compacted to move the backfill into any voids not filled by the deflection of the backfill.

In either form, the backfill deflectors 12, 14 enable the tank 10 to be stored underground without requiring any workers to enter an excavation 19 in which the tank 10 is placed. Desirably, this eliminates the requirement for any sheet piling or sloping of the walls 70 of the excavation 19 to dramatically reduce the time and cost to make the excavation 19 for the tank 10. Further, due to the significantly reduced risk of injury to the workers installing the tank 10, the improved method of installing the tank 10 dramatically reduces the risk of injury to workers installing the tank 10 which should reduce workman's compensation liability insurance rates for the workers. Further, the backfill deflectors 12, 14 facilitate providing a compacted and evenly distributed backfill underneath and along the entire length of the tank 10 to evenly support the tank 10 and prevent the tank 10 from bending, buckling or fracturing in use. Still further, anchoring the tank 10 to the backfill deflectors 12, 14 prevents it from becoming buoyant and lifting out of the ground, eliminates the need to tie the tank 10 to a slab in the excavation 19 and the need for a concrete slab over the top of the tank.

What is claimed is:

1. Apparatus for deflecting backfill for a storage tank generally circular in cross section, comprising:
   a deflector having a base having a length at least substantially as long as a tank with which it is to be used, adapted to lie flat on a bottom of an excavation in which the tank is installed and having an edge generally parallel to a longitudinal axis of the tank disposed generally adjacent to the tank in use and an opposed edge spaced further from the tank;
   said deflector also having an inclined wall disposed at an acute included angle relative to the base and extending from the edge of the base generally adjacent to the tank whereby backfill provided onto the inclined wall is directed underneath the tank.

2. The apparatus of claim 1 which also comprises at least one support disposed between the base and inclined wall to maintain their relative positions.

3. The apparatus of claim 2 wherein a plurality of supports are provided with each support having a pair of support plates with a predetermined space therebetween.

4. The apparatus of claim 3 which also comprises at least one tie down strap having a loop at one end adapted to be received between a pair of support plates and releasably attached thereto.

5. The apparatus of claim 4 which also comprises a second deflector constructed in the same manner with at least one tie down strap extending between and connected to both of the deflectors.

6. The apparatus of claim 5 wherein each deflector has a leg extending therefrom with an adjustment rod slidably received in each leg and releasably connectable to each leg to permit the distance between the deflectors to be changed.

7. The apparatus of claim 6 which also comprises a second leg extending from each deflector with a leg disposed generally at each end of each deflector.

8. The apparatus of claim 4 which also comprises a bolt extending through the loop and each of the pair of support plates between which the loop is received.

9. The apparatus of claim 2 wherein each support is generally triangular.

10. The apparatus of claim 1 wherein the inclined wall extends at an angle of between 20 and 70 degrees relative to the base.

11. The apparatus of claim 10 wherein the inclined wall extends at an angle of 45 degrees relative to the base.

12. The apparatus of claim 1 which also comprises a support pan constructed to be disposed directly beneath the tank and to which the deflector is attached.

13. The apparatus of claim 12 wherein the deflector is pivotally carried by the support pan and is movable between retracted and extended positions.

14. The apparatus of claim 12 which also comprises a second deflector attached to the support pan and adapted to be disposed on an opposite side of the tank as the other deflector.

15. A method of installing a generally cylindrical underground storage tank in an excavation, comprising the steps of:
   a) providing an excavation;
   b) disposing a pair of deflectors and the tank into the excavation with a deflector along each side of the tank on the bottom of the excavation;

c) introducing backfill into the excavation with at least some of the backfill contacting each deflector to position backfill under the tank;

d) compacting the backfill under the tank to fill any voids in the backfill and provide generally uniform support to the tank; and e) adding additional backfill until the tank is at least substantially covered by backfill to complete the installation of the tank.

16. The method of claim 15 wherein steps c) and d) are repeated as desired to provide a generally uniformly compacted backfill under and around the tank.

17. The method of claim 15 wherein each step is completed without requiring any workers installing the tank to enter the excavation at any time.

18. The method of claim 15 which, before step c), also comprises the step of attaching straps to each deflector which extend over the tank.

19. The method of claim 15 wherein the compacting step is carried out with a vibrating compactor having a probe lowered into the excavation from outside the excavation.

* * * * *